United States Patent
Saint-Martin et al.

(10) Patent No.: US 7,748,903 B2
(45) Date of Patent: Jul. 6, 2010

(54) FLEXIBLE CONTAINER WITH INCORPORATED GUIDE MEMBER

(75) Inventors: Bernard Saint-Martin, Montrouge (FR); Stéphanie Armau, Ossun (FR)

(73) Assignee: Sartorius Stedim Aseptics SA, Lourdes (FR)

( * ) Notice: Subject to any disclaimer, the term of this patent is extended or adjusted under 35 U.S.C. 154(b) by 1048 days.

(21) Appl. No.: 11/374,426

(22) Filed: Mar. 14, 2006

(65) Prior Publication Data
US 2007/0095426 A1 May 3, 2007

(30) Foreign Application Priority Data
Mar. 15, 2005 (FR) .................................. 05 02547

(51) Int. Cl.
*B65D 33/00* (2006.01)
(52) U.S. Cl. ................. 383/36; 383/906; 193/25 C; 222/522; 222/529; 141/114; 141/312; 141/366
(58) Field of Classification Search ............... 193/25 R, 193/25 B, 25 C; 383/36, 121.1, 906; 414/299, 414/180, 199; 222/92, 100, 107, 522, 525–527, 222/529; 141/114, 251, 258, 312, 331, 337, 141/363–366; 220/256.1, 501, 502; 206/277, 206/538, 540
See application file for complete search history.

(56) References Cited

U.S. PATENT DOCUMENTS

| | | | | |
|---|---|---|---|---|
| 3,428,156 | A * | 2/1969 | Charyn et al. | 193/22 |
| 3,738,464 | A | 6/1973 | Ortlip et al. | |
| 4,629,080 | A * | 12/1986 | Carveth | 215/11.1 |
| 4,942,953 | A | 7/1990 | Chefson | |
| 5,853,207 | A * | 12/1998 | Saint Martin et al. | 292/256.6 |
| 6,019,147 | A | 2/2000 | Prescott et al. | |
| 6,065,922 | A | 5/2000 | Kato et al. | |
| 6,527,444 | B1 * | 3/2003 | Buchman | 383/36 |
| 6,537,509 | B2 | 3/2003 | Saint-Martin et al. | |
| 7,104,293 | B2 * | 9/2006 | Lais et al. | 141/302 |

FOREIGN PATENT DOCUMENTS

FR 2782071 2/2000

* cited by examiner

*Primary Examiner*—Gregory L Huson
*Assistant Examiner*—Jason K Niesz
(74) *Attorney, Agent, or Firm*—Young & Thompson

(57) ABSTRACT

A container for transferring a product with crossed protection, having a flexible portion connected to an opening provided with a flange in which is mounted a door that is mobile between a closed position and at least one open position, is characterized in that it includes a guide member 15 adapted to cause an internal portion of the wall of the flexible portion to project through the flange 11A or to retract that portion inside the container. A container of this kind is used to transfer a powder, a granular material or small objects, in particular, from the bottom of the container or from another container.

14 Claims, 2 Drawing Sheets

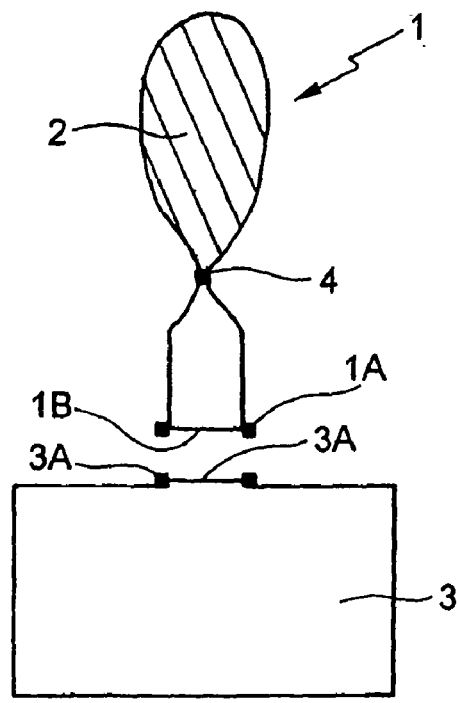
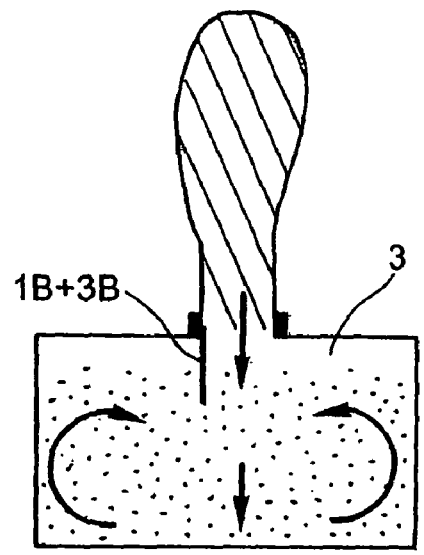
Fig.1  Fig.2
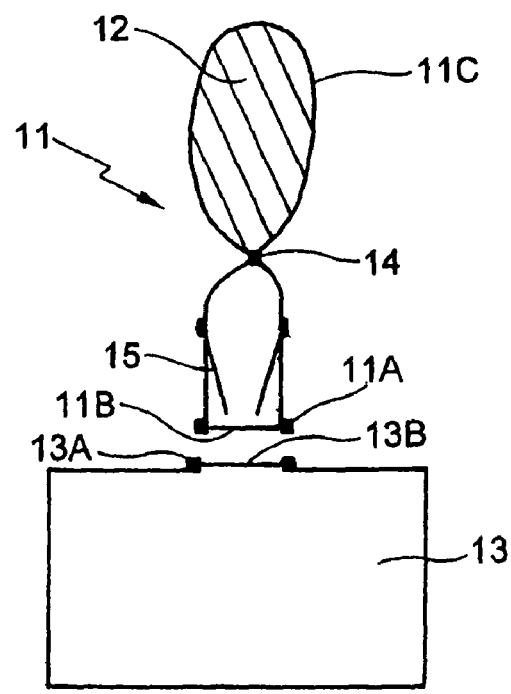
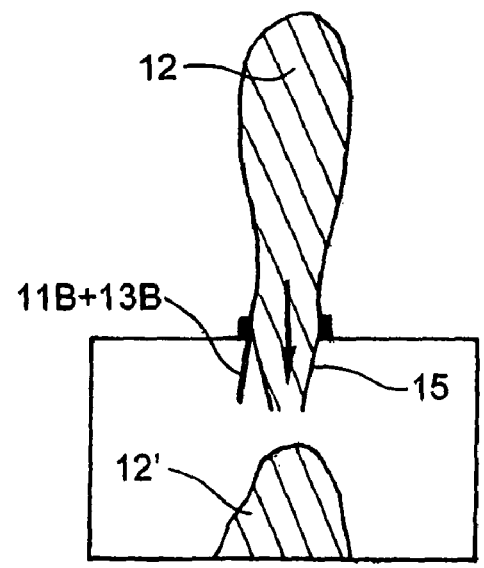
Fig.3  Fig.4

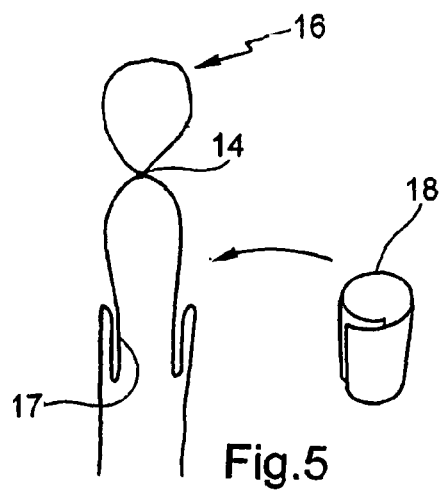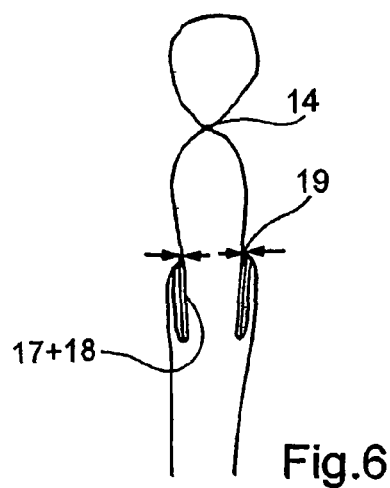
Fig.5    Fig.6
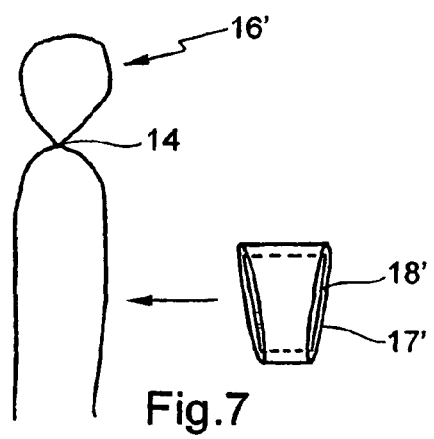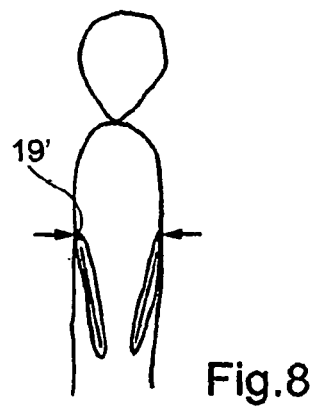
Fig.7    Fig.8
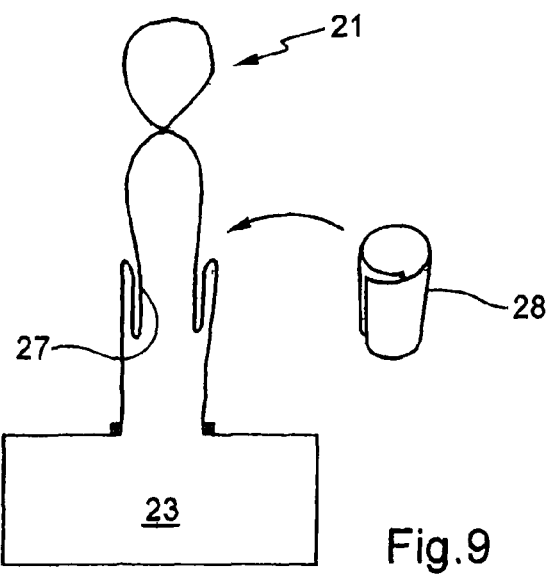
Fig.9

FLEXIBLE CONTAINER WITH INCORPORATED GUIDE MEMBER

The invention relates to a container at least one portion of which is flexible and which is adapted to transfer contaminating, sterile or sterile and toxic products with so-called crossed protection (meaning that the product is protected from external contamination and at the same time the operative is protected from the product). The invention relates in particular to a flexible or partially flexible container, in practice a disposable container for sterile applications, adapted to be used in particular for transferring powder.

The document FR-2 721 289 (or EP-0 688 020 or U.S. Pat. No. 5,853,207) discloses a sealed junction device between two enclosures isolated from an external environment and a disposable enclosure adapted to be used in a device of that kind. In principle one such disposable enclosure is mobile whereas the other enclosure may be a larger and heavier enclosure, for example a sterilization enclosure or a reactor. Each of the enclosures is provided with an opening provided with a flange that is normally blocked by a door and the sealed junction between these enclosures entails maneuvering the two doors conjointly.

For practical reasons, these disposable enclosures, also known as disposable containers, generally consist of the combination of a rigid door (or lid) and a flexible, usually transparent, plastics material sachet (or bag). Disposable containers of this kind may be used to transfer all kinds of liquid, solid or powder products to (or even from) larger enclosures.

However, this type of container has been found to have the disadvantage of producing a so-called "hazard ring" because, for the door of the disposable container to be able to pass through the opening of the other enclosure (when it is moved conjointly with the door of the enclosure), its diameter must be smaller than that of the door of the other enclosure (otherwise there would be a risk of the door becoming wedged in the opening of the other enclosure). However, this difference in diameter produces on the larger door a ring of greater or lesser width (depending on the difference in the diameters) that may be exposed to the external environment and to the internal environment of the system formed by the disposable container and the larger enclosure, which compromises strict separation of the internal and external environments required in sterile applications.

A hazard ring of this kind proves to be particularly problematic when a system of the above kind is used to transfer powder products, especially in the case of powders of low density, because, if adequate precautions are not taken, each passage of these products through the openings is liable to generate a cloud of powder particles that can thereafter be deposited (in part) on the hazard ring and thus contaminate it (and thereby destroy the sterility of the internal environment if the latter is sterile). Furthermore, after several transfers, the powder deposits may become sufficiently thick to degrade the quality of the seal at the connection of the facing surfaces of the lids and contaminate the external environment of the system.

The Applicant proposed a first solution to this problem in the document FR-2 782 071, which describes a disposable container whose door is itself enclosed in a sealed sachet prior to use. Remember that, in the context of a sterile application, the sealing concept primarily means that there is no passage of micro-organisms from the inside to the outside and vice versa. The disposable container preferably includes a sleeve of smaller diameter than the door of the larger enclosure connected to a wider portion of the container. This guides the powder toward the interior of the other container, beyond the hazard ring (and therefore minimizes the risks associated with that ring), provided that the operative can access the end of the sleeve inside the large enclosure to introduce the sleeve into the large enclosure, in the manner of a horn. This kind of access may be obtained by means of sleeves in the case of using an isolator or by appropriately dressed personnel in the case of larger enclosures, for example white rooms with laminar flow hoods or controlled environment areas.

The Applicant has proposed another solution in the document FR-2 808 198 (or U.S. Pat. No. 6,537,509), which teaches the provision of a mobile closure member adapted to allow sterilization of the door of the larger enclosure, in isolation, in practice by steam, enabling the hazard ring to be cleaned periodically. However, this does not prevent the formation of a powder deposit on the hazard ring.

A first aspect of the invention is a container that is flexible (at least in part) and adapted to transfer powder with crossed protection, minimizing the risk of depositing powder on the external surface of a door of a large enclosure to which that container may be connected in order to pour the powder into it, especially if the powder is light, and without having to access a portion of the container from inside the large enclosure.

Another aspect of the invention is a container adapted to transfer a product, in particular a contaminating product or a sterile but toxic product, into an enclosure, with crossed protection, and to guide the product into the enclosure without having to access the container from inside the enclosure.

To this end, the invention proposes a container for transferring a product with crossed protection, having a flexible portion connected to an opening provided with a flange in which is mounted a door that is mobile between a closed position and at least one open position, characterized in that it includes a guide member adapted to cause an internal portion of the wall of the flexible portion to project through the flange or to retract that portion inside the container.

The container may take the form of a flexible sachet or a container of which the bottom is rigid and only a portion near the opening is flexible. In particular, it may also be a container in which the portion close to the connecting opening is flexible whereas the opposite portion is a bottom provided with an opening formed by a door and adapted to be connected to another container, rigid or otherwise, containing the product to be transferred, such as a metal or glass flask.

In fact, the presence of the guide member also has the objective of enabling the contents of the container to be poured into an enclosure in a direction transverse to the vertical direction, which explains why the container of the invention, as defined hereinabove, is not limited to a container filled with powder: it is entirely suited to pouring powder, but may also be used for the transverse pouring of other types of dry product that can be poured, for example granular materials, small objects, and the like that have to be poured through a lateral door of the enclosure.

The container of the invention can also be used to pour liquid products, either to minimize the risk of splashing or because lateral pouring is required.

According to advantageous features of the invention, which may, where appropriate, be combined:

the guide member is a slit rigid material tube so that the section of the tubular member may be varied by elastic deformation; the tubular member may instead be made of a more flexible material, but may prove to be more difficult to manipulate from outside the container than a rigid material member;

the guide member is a tubular member adapted to assume a frustoconical shape at least temporarily with a front edge adapted to project out of the container and a rear edge extending internally along the lateral wall of the sachet; the frustoconical shape preferably has a half-angle at the apex from 1° to 10°, which corresponds to a cone angle sufficient to achieve a funnel effect at the same time as allowing the necessary movements for it to project out of the container;

in one embodiment the tubular member is enclosed in a sheath one region whereof, disposed opposite the flange relative to the flange, is attached to the lateral wall of the sachet and the internal portion whereof constitutes the portion adapted to project; for reasons of compatibility and continuity, the sheath is advantageously made of the same material as the lateral wall of the sachet;

in another embodiment the tubular member is engaged in a fold in the lateral wall of the sachet the bottom of which is oriented toward the flange; the fold in which the tubular member is engaged is preferably closed at the end opposite the flange relative to the tubular member in order to enclose the tubular member in the fold; to be more precise, the fold is advantageously closed by a circumferential weld; however, this fold may instead be formed in a standard container and a tube inserted into it at the time of pouring the content into an enclosure, in a further embodiment, the guide member may consist only of a portion of tube, or be formed of a plurality of longitudinal members adapted to push internal portions of the wall of the container into the enclosure.

The invention further consists in a container of the type cited above having the particular feature that it contains powder.

Objects, features and advantages of the invention emerge from the following description, which is given by way of illustrative and nonlimiting example and with reference to the appended drawings, in which:

FIG. 1 is a diagram representing a standard flexible container containing powder on the point of being connected to the opening of an enclosure into which the powder from the container is to be poured, FIG. 2 is a diagram representing the pouring of the powder from the standard flexible container into the enclosure, FIG. 3 is a diagram representing a flexible container of the invention on the point of being connected to the opening of an enclosure in order to pour into it powder contained in the container, FIG. 4 is a diagram representing the pouring of the powder from the flexible container of the invention into the enclosure, FIG. 5 is a diagram representing an intermediate step in the fabrication of a flexible container conforming to a first embodiment of the invention, FIG. 6 is a diagram representing that flexible container after connection to an enclosure;

FIG. 7 is a diagram representing an intermediate step in the fabrication of another flexible container conforming to a second embodiment of the invention, FIG. 8 is a view similar to FIG. 6 but pertaining to the embodiment of FIG. 7, and FIG. 9 is a diagram representing the preparation of a standard flexible container connected to an enclosure in order to convert it into a flexible container of the invention.

FIGS. 1 and 2 correspond to a standard configuration in which a standard flexible container 1 contains powder 2 that is to be poured into an enclosure 3, for example a reactor. Here the enclosure 1 is represented in a highly simplified manner, but is advantageously of a type described in the documents referred to hereinabove. In principle it is a disposable flexible container including a flexible sachet having an opening bordered by a flange 1A in which there is mounted a door 1B mobile between a position of blocking this flange, and therefore this opening, and at least one open position allowing communication of the interior of the container with the interior of an enclosure to which the container is temporarily connected.

Similarly, the enclosure 3 is represented in a highly simplified manner, but is advantageously of a type described in the documents cited above, with an opening provided with a flange 3A in which is mounted a door 3B mobile between a position blocking the flange and at least one open position allowing communication with the interior of a container connected to it.

As indicated in the documents cited above, the door 3B of the enclosure advantageously pivots toward the interior of the enclosure whereas the door 1B of the flexible container advantageously pivots outwards, and the doors are adapted to be sealed to each other before moving them to their respective open positions to minimize contamination by the environment of the surfaces isolated in this way (and, conversely, to minimize contamination of the environment by those surfaces); however, as explained hereinabove, in practice there then remains a hazard ring.

In FIG. 1, the two doors 1B and 3B are sealing their respective flanges 1A and 3A. A clamping member 4 of any appropriate type known in the art is in principle provided to separate the internal volume of the container into a portion filled with powder and a portion adjacent the door, allowing powder to flow after opening the door.

In FIG. 2, the two flanges 1A and 3B are joined together and the doors have been pivoted conjointly toward the interior of the enclosure 1.

Unlike what happens when a bottle containing a liquid is emptied, the pouring of the powder from the flexible sachet of the container may be accompanied by a reduction of the internal volume of the flexible sachet, so that there is no significant phenomenon of gulping of air, which encourages a low level of turbulence in the flow through the flange of the container.

On the other hand, the powder flows freely between the flange of the enclosure and the surface on which the powder accumulates, which is liable to generate movements within the moving mass of powder (symbolized by arrows in FIG. 2), thereby creating a cloud of powder particles which is larger the lighter the powder, with the risk of deposition of the powder on all the surfaces exposed to the cloud, including the accessible surfaces of the doors, especially the hazard ring defined hereinabove.

FIGS. 3 and 4 represent a flexible container configuration that greatly reduces this phenomenon of a cloud of powder particles and the unwanted deposition of powder.

In these figures, components similar to those from FIGS. 1 and 2 are designated by reference numbers that are deduced from those used in those figures by adding 10.

Thus, in FIG. 3, a container 11 of the invention contains powder 12 that is to be poured into an enclosure 13 through respective openings bordered by respective flanges 11A and 13A normally closed by respective doors 11B and 13B. A clamping member 14 isolates a portion 11C of the container that is filled by the powder relative to the flange (here with no residual void).

According to the invention, the container further includes a guide member 15 adapted to feed a portion of the internal surface of the container into the interior of the enclosure 13 to guide the flow of powder as close as possible to the surface on which it should accumulate (at 12A). It is clear from FIG. 4 that, the closer to that receiving surface such guidance is provided, the smaller will be any cloud resulting from the flow of the powder.

The guide member 15 preferably has the shape of a funnel converging toward the exterior of the container, through the flange, either inherently or by reason of temporary deformation. The cone angle of this member 15 need not be very large because it is sufficient to be able to manipulate the upper end of this member from outside the container and to collect all of the powder over the whole of the section of the container 11, whilst its lower end is able to pass through the flange of the enclosure. Another object of this cone shape is to facilitate the folding of the lateral wall of the sachet between the flange and the guide member when the latter comes to project from the container. In principle, the wider portion of the member 15 remains outside the enclosure to guarantee that it can be withdrawn from the enclosure after pouring out all of the powder. The cone angle of this cone shape (whether permanent or temporary) —sometimes referred to as the half-angle at the apex—is preferably from 1 to 10°, although greater values may be used, if appropriate.

The guide member may be a tube (cylindrical or conical) with a continuous periphery and advantageously made from a flexible material.

However, the member 15 is preferably a tube (cylindrical or conical) of a rigid material but slit so that its section may be varied by elastic deformation. This member may in particular be made from a plastics material such as a Bakelite.

With the doors open, by exploiting the deformity of the lateral wall of the container, at least above the flange, the operative slips the guide member through the opening of the enclosure, ideally as far as the surface receiving the powder, or otherwise as close as possible to the latter (it is evident that the length of the guide member is limited in particular by the length of the container and of the portion of the container that is filled with powder). If the guide member is a slit tube, it clearly suffices to squeeze the tube to reduce its section and thereby facilitate penetration into the opening of the enclosure.

The operative then releases the clamping member so that the powder flows and creates a small heap on the receiving surface by virtue of a substantially regular flow from the original location of the powder in the container, through the opening of the enclosure and along the entire length of the guide member.

As the heap is formed and grows, the operative raises the guide member to allow continual growth of the heap, at the same time as minimizing the risk of a cloud of powder particles forming liable afterwards to form an unwanted deposit.

Once the container empty, the guide member is completely removed from the enclosure, the doors are closed and the container is disconnected. In practice the container is then taken away, closed permanently and sent to an incinerator to be destroyed, with no risk of contaminating the operatives or the environment.

FIGS. 5 to 9 represent diverse embodiments of a flexible container of the invention.

To be more precise, FIGS. 5 to 8 represent two embodiments of containers that are provided with guide members beforehand and FIG. 9 corresponds to a situation in which a standard container is fitted with this kind of guide member at the time of using it.

In FIG. 5, a sachet 16 intended to form part of a container of the invention (there is as yet no flange or door) is prepared and is then deformed so that its lateral wall features a fold 17 whose bottom is oriented toward the flange. A slit tube 18 is then engaged in that fold from the outside, after which the edges of the fold are welded along a line denoted 19 in FIG. 6 to trap the tube in the fold (the arrows symbolize the welding operation).

Alternatively, starting with a sachet 16' (FIG. 7), a slit tube 18' that is prepared in parallel is housed in a sheath 17' that surrounds it completely in a sealed manner. The sheath is then welded (FIG. 8) at an appropriate level 19' to the inside of the lateral wall of the sachet 16'.

For compatibility and for optimum continuity between the lateral walls of the sachet and the sheath, these walls are advantageously made from the same material.

FIG. 9 represents a configuration that is very similar to that of FIG. 5 except that the container 21 is already complete (with its flange and its door) and is connected to an enclosure 23. By analogy with the foregoing description with reference to FIG. 5, the flexible container is deformed so that its lateral wall features a fold 27 the bottom of which is oriented toward the flange and in which a slit tube 28 is engaged. However, since this fitting is effected immediately before opening the doors and pouring the powder, and because the container is disposable, it is not necessary to execute a weld to hold the tube in place in the fold. Obviously this FIG. 9 configuration may prove less practical than that of FIGS. 5 and 6 or that of FIGS. 7 and 8, but it has the advantage of enabling the use of standard containers by adapting them at the time of use. It also enables the use of guide members that can be longer than is possible given the dimensions of the container when filled with powder.

It should be emphasized that the operative has nothing to check, either on receiving containers of the FIG. 5 to 8 type or after adapting a standard container as shown in FIG. 9, since the guide member forming a funnel has no direct contact with the content of the sachet. Thus the fact of adding the guide member does not alter in any way the performance in terms of isolation of the interior of the sachet.

Tests carried out with lactose have demonstrated the efficacy of a guide member of the above kind in procuring a regular flow of the lactose, without it falling freely, leading to the formation of a cloud of particles, without the guide member coming into contact with the lactose, and without intervention being necessary from inside the enclosure.

Note that in the foregoing description the enclosure into which the powder is to be poured from a flexible container is assumed to include a door at the top, so that the powder can be poured by gravity alone. It will nevertheless be evident that flexible containers of the invention are equally usable with enclosures having a door that has a direction of penetration inclined to the vertical at an angle of less than 90°, to exploit gravity in combination with a transverse guiding effect procured by the guide member. Since in this way it is possible to introduce powder through an opening of the enclosure that is not vertically above the powder receiving surface, one advantage of the invention is that it helps to reduce the constraints in respect of the location of the enclosure openings.

In a variant that is not shown, the content of the upper portion of the container represented in the figures may be another dry material, for example a granular material or small objects, or even a liquid material.

Moreover, in another variant that is not shown, instead of being entirely flexible, the container may have a rigid bottom (containing the product to be poured) or take the form of a sleeve including a portion for temporary connection to another container that is rigid (or even itself flexible).

The invention that has just been described is situated in the general field of crossed protection.

In practice, the containers used generally have a volume from 1 to 50 liters, users requiring greater volumes being more rare (and users requiring volumes up to 500 liters being entirely exceptional).

When it is a powder, the product is often an active or toxic product liable to contaminate personnel (whence the requirement to protect personnel). At present, such powders are also required to be sterile. The fact of packaging them in flexible containers, sterilizing them in bulk by irradiation and finally transferring them under sterile conditions resists all cross-contamination.

The invention claimed is:

1. A container for transferring a product with crossed protection, comprising:
   a sachet (16) having an opening;
   a flange (11A) having an opening defining an exterior opening of the container;
   an outward moving door (11B) mounted within the opening of the flange, the door being mobile between a closed position and an open position such that the door makes the exterior opening closed or open;
   a flexible portion connected to and located between the opening of the sachet and the opening of the flange, the flexible portion comprising a wall; and
   a tubular guide member (18, 18', 28) surrounded by an internal portion of the wall of the flexible portion, wherein,
   the guide member has an upper edge located toward the opening of the sachet and a free lower edge located toward the opening of the flange,
   in an unfolded state of the flexible portion, the guide member free lower edge is located above the opening of the flange,
   in moving from the unfolded state of the flexible portion to a folded state of the flexible portion, the guide member is adapted to cause the internal portion of the wall of the flexible portion surrounding the guide member to project through the flange (11A), and
   in moving from the folded state of the flexible portion to the unfolded state of the flexible portion, the guide member is adapted to retract the internal portion of the wall of the flexible portion back through the flange.

2. Container according to claim 1, wherein the tubular guide member comprises a slit rigid material tube so that cross-section of the tubular guide member may be varied by elastic deformation.

3. Container according to claim 1, wherein the guide member has a frustoconical shape with the free lower edge adapted to project out of the container through the opening of the flange.

4. Container according to claim 3, wherein the frustoconical shape has a half-angle at the apex from 1° to 10°.

5. Container according to claim 3, wherein,
   the tubular guide member (18') is enclosed in a sheath (17'), the sheath being comprised of the internal portion of the wall, and
   one region of the sheath is attached (19') to a lateral wall of the flexible portion.

6. Container according to claim 5, wherein the sheath is made of the same material as the lateral wall of the flexible portion.

7. Container according to claim 3, wherein the tubular guide member (18, 28) is engaged in a fold (17, 27) in a lateral wall section of the flexible portion, the bottom of which fold is oriented toward the flange.

8. Container according to claim 7, wherein the fold (17) in which the tubular member (18) is engaged is closed at the end opposite the flange relative to the tubular member in order to enclose the tubular member in the fold.

9. Container according to claim 8, wherein the fold is closed by a circumferential weld.

10. Container according to any one of claim 1, 5 or 7, wherein the sachet is a flexible sachet.

11. Container according to any one of claim 1, 5 or 7, wherein the container has a rigid bottom.

12. Container according to any one of claim 1, 5 or 7, further comprising:
    a clamping member clamping closed the opening of the sachet, and
    wherein the product for transferring is a powder located within the sachet.

13. A container for transferring a product located within to an enclosure with crossed protection, comprising:
    a sachet having an opening,
    a flange having a main opening,
    a flexible generally annular wall portion connected to and between the sachet at the sachet opening and the flange around the flange main opening,
    a door mounted in relationship with the main opening, the door mobile between a closed position and an open position, wherein the door, respectively, makes the main opening closed or open,
    a generally tubular guide member connected at a first end near the sachet opening and having a free second end,
    the guide member located within the flexible generally annular wall portion,
    the guide member having an outer diameter at the free end and along a substantial axial portion from the free end smaller than an inner diameter of the main opening,
    the guide member capable to being moved axially with respect to the main opening from one side of the main opening to the other side of the main opening, and
    the flexible generally annular wall portion being folded on itself when the guide member is moved from the one side of the main opening to the other side of the main opening.

14. A container for transferring a product with crossed protection, comprising:
    a sachet (16) having an opening;
    a flange (11A) having an opening defining an exterior opening of the container;
    an outward moving door (11B) mounted within the opening of the flange, the door being mobile between a closed position and an open position such that the door makes the exterior opening closed or open;
    a flexible wall portion connected to and located between the opening of the sachet and the opening of the flange; and
    a tubular guide member connected at a first end near the sachet opening and having a free second end,
    the guide member located within the flexible wall portion,
    the guide member having an outer diameter at the free end smaller than an inner diameter of the flange opening,
    the guide member being movable axially with respect to the flange opening so that the free second end moves from i) one side of the flange opening above the flange opening, through the flange opening, to ii) the other side of the flange opening below the flange opening, and
    the flexible wall portion folding when the guide member is moved from the one side of the main opening to the other side of the main opening.

* * * * *